(12) United States Patent
Zhu et al.

(10) Patent No.: US 8,538,180 B2
(45) Date of Patent: Sep. 17, 2013

(54) METHOD AND APPARATUS FOR GENERATING JPEG FILES SUITABLE FOR PARALLEL DECODING

(75) Inventors: Ke Zhu, Suwon-si (KR); Jung-min Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 213 days.

(21) Appl. No.: 13/213,788

(22) Filed: Aug. 19, 2011

(65) Prior Publication Data

US 2012/0155767 A1 Jun. 21, 2012

(30) Foreign Application Priority Data

Dec. 20, 2010 (KR) ........................ 10-2010-0130985

(51) Int. Cl.
*G06K 9/36* (2006.01)
*G06K 9/46* (2006.01)

(52) U.S. Cl.
USPC ........................................................ 382/246

(58) Field of Classification Search
USPC .... 382/164, 173, 232, 233, 246; 375/240.23, 375/E7.04, E07.027, E7.187, E7.226; 348/231.99, 552; 358/539
See application file for complete search history.

(56) References Cited

U.S. PATENT DOCUMENTS

| 5,768,446 | A | * | 6/1998 | Reasoner et al. | ............. 382/304 |
| 5,848,192 | A | * | 12/1998 | Smith et al. | .................... 382/232 |
| 6,310,647 | B1 | * | 10/2001 | Parulski et al. | ........... 348/231.99 |
| 6,608,933 | B1 | * | 8/2003 | Dowell et al. | ................... 382/232 |
| 6,941,019 | B1 | * | 9/2005 | Mitchell et al. | ................ 382/232 |
| 7,146,053 | B1 | * | 12/2006 | Rijavec et al. | ................. 382/233 |
| 2011/0013850 | A1 | * | 1/2011 | Wang et al. | .................... 382/233 |
| 2012/0155767 | A1 | * | 6/2012 | Zhu et al. | ....................... 382/173 |

* cited by examiner

*Primary Examiner* — Amir Alavi
(74) *Attorney, Agent, or Firm* — Sughrue Mion, PLLC

(57) ABSTRACT

A method and apparatus for generating a Joint Photographic Experts Group (JEPG) file achieves fast decoding speed by enabling efficient locating of restart markers at a decoder. The method and apparatus determining a location to insert at least one restart marker by analyzing an image, performing entropy-encoding, by dividing the image into a plurality of segments based on the determined location in order to insert the restart marker, and inserting the restart marker to the determined location in order to insert the reset maker with respect to each of the plurality of entropy-encoded segments. The method performed by the apparatus includes calculating an offset value of the at least one restart marker with respect to each of the plurality of segments, based on a data size of each of the plurality of segments and a data size of the restart marker, calculating an offset value by scan number from a start of image (SOI) marker based on the calculated offset value of the restart marker, in response to the calculated offset value of the restart marker corresponding to a last segment that is entropy-encoded. The method and apparatus further store the calculated offset value by scan number, as additional application data.

20 Claims, 9 Drawing Sheets

FIG. 2
(RELATED ART)

| |
|---|
| SOI(Start of Image) |
| APP0~APP15 |
| DQT(Define Quantization Tables) |
| SOF(Start Of Frame) |
| DHT(Define Huffman Tables) |
| SOS(Start Of Scan) |
| Scan Data |
| EOI(End Of Image) |

FIG. 8

| | |
|---|---|
| APPn Header | |
| Frame Number | 1byte |
| Scan Number | 1byte |
| Offset Value of Segment #1 | 4byte |
| Offset Value of Segment #2 | 4byte |
| .... | |
| Offset Value of Segment #n | 4byte |
| Frame Number | 1byte |
| Scan Number | 1byte |
| Offset Value of Segment #1 | 4byte |
| Offset Value of Segment #2 | 4byte |
| .... | |
| Offset Value of Segment #n | 4byte |
| .... | |

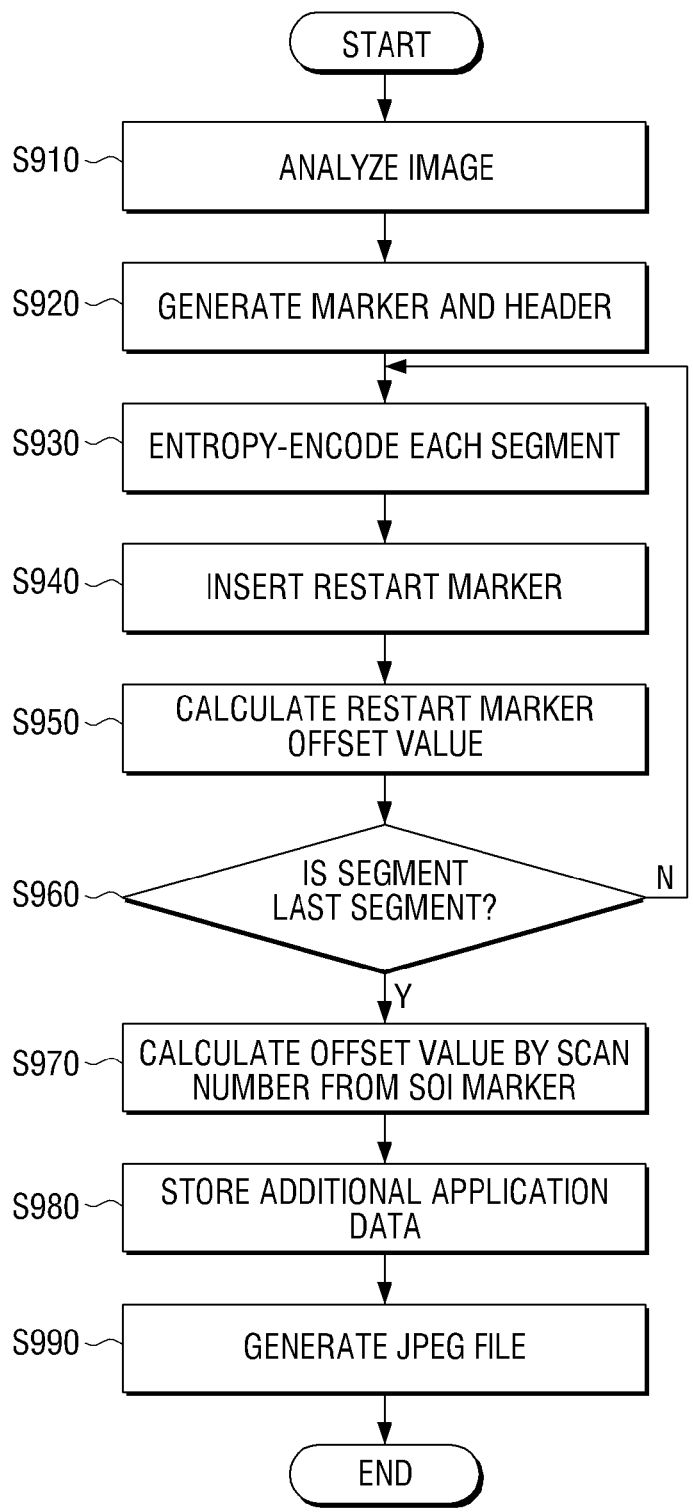

METHOD AND APPARATUS FOR GENERATING JPEG FILES SUITABLE FOR PARALLEL DECODING

CROSS-REFERENCE TO RELATED APPLICATIONS

This application claims priority from Korean Patent Application No. 10-2010-0130985, filed on Dec. 20, 2010, in the Korean Intellectual Property Office, the disclosure of which is incorporated herein by reference in its entirety.

BACKGROUND

1. Field

Methods and apparatuses consistent with the disclosure provided herein relate to generating Joint Photographic Experts Group (JPEG) files, and more particularly to a method and an apparatus for generating JPEG files suitable for parallel decoding.

2. Description of the Related Art

Generally, image data is stored in compressed form for efficient storage and transmission. The Joint Photographic Experts Group (JPEG) provides a standard for image compression, and thanks to the high compression efficiency, JPEG has been widely used as a file format for compressing still photo images, such as photographs.

The JPEG encoding process generally includes several stages. First, pixels of the image may be converted from red, green and blue (RGB) into YCbCr, in which YCbCr includes one luma component (Y) representing brightness and two chroma components (Cb and Cr) representing colors.

Next, the image may be divided into 8×8 pixel blocks, in which each of Y, Cb and Cr data is discrete cosine transformed (DCT) with respect to each block, and amplitude, the frequency component, is quantized.

Next, after the DCT process, the resultant data with respect to all the 8×8 pixel blocks are additionally compressed using techniques including, for example, zig-zag scanning, Huffman coding, run-length coding, variable length coding (VLC), entropy coding techniques such as applications of coded block patterns (CBP), and a differential technique. Meanwhile, the decoding process may be carried out in reverse order from that of the JPEG encoding stages explained above, in order to reproduce arrays of the pixel values usable for driving a display.

Meanwhile, as the resolution of images increases, the size of a compressed image file is increased in order to obtain an image with better quality. In order to decode these large volumes of image files, a more complicated decoding process is necessary. Accordingly, to improve decoding processing speed, parallel processing is necessary, and the JPEG provides the 'restart marker' as a way of parallel processing in order to distinguish entropy-encoded data segments, so that the compressed data segments are decoded independently.

However, since the decoder has to confirm the locations of the restart markers by analyzing the JPEG file in order to carry out parallel decoding, the restart marker alone cannot efficiently support parallel decoding.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

According to one embodiment, a technical objective is to provide a method and an apparatus for generating a Joint Photographic Experts Group (JEPG) file with improved decoding speed in which a decoder is enabled to efficiently confirm the locations of the restart markers.

In one embodiment, a method for generating a Joint Photographic Experts Group (JEPG) file is provided, which may include determining a location for insertion of at least one restart marker by analyzing an image, performing entropy-encoding, dividing the image into a plurality of segments based on the determined location to insert the restart marker, and inserting the restart marker to the determined location to insert the restart marker with respect to each of the plurality of entropy-encoded segments, calculating an offset value of the at least one restart marker with respect to each of the plurality of segments, based on a data size of each of the plurality of segments and a data size of the restart marker, calculating an offset value by scan number from a start of image (SOI) marker based on the calculated offset value of the restart marker, as a result of the calculated offset value of the restart marker corresponding to a last segment that is entropy-encoded, and storing the calculated offset value by scan number as additional application data.

The location to insert the at least one restart marker is randomly set by a user.

In one embodiment, after analyzing the image, the method may additionally include generating a marker and a header related to entropy-encoding.

The method may additionally include temporarily storing the marker and the header.

The method may additionally include generating the JPEG file by integrating the marker and the header, the plurality of entropy-encoded segments, and the stored additional application data.

The insertion of the restart marker to the determined location comprises inserting the restart marker at the end of each of the entropy-encoded segments.

An offset value of a first segment of the plurality of entropy-encoded segments is zero (0).

The offset value of a segment (n) of the plurality of entropy-encoded segments is a sum of the offset value of a segment (n-1), a data size of the restart marker, and a data size of the segment (n).

The calculating of the offset value by scan number may include calculating a segment offset value by scan number, with reference to a scan header.

The additional application data may include at least one of a frame number, a scan number, and an offset value of each segment.

According to another aspect of an exemplary embodiment, an apparatus for generating a Joint Photographic Experts Group (JEPG) file is provided, which may include a restart marker insertion location determining unit which determines a location to insert at least one restart marker by analyzing an image, a restart marker inserting unit which performs entropy-encoding, by dividing the image into a plurality of segments based on the determined location to insert the restart marker, and inserts the restart marker at the determined insert location with respect to each of the plurality of entropy-encoded segments, an offset value calculating unit which calculates an offset value of the at least one restart marker with respect to each of the plurality of segments, based on a data size of each of the plurality of segments and a data size of the restart marker, a calculating unit for calculating an offset value by scan number, which calculates an offset value by scan number from a start of image (SOI) marker based on the calculated offset value of the restart marker, in response to the calculated offset value of the restart marker corresponding to a last segment that is entropy-encoded, and an additional application data storage unit which stores the calculated offset value by scan number as additional application data.

The location to insert the at least one restart marker is randomly set by a user.

The apparatus may additionally include a marker and header generating unit which generates a marker and a header related to the entropy-encoding.

The apparatus may additionally include a temporary storage unit which temporarily stores the marker and the header.

The apparatus may additionally include a JPEG file generating unit which generates the JPEG file by integrating the marker and the header, the plurality of entropy-encoded segments, and the stored additional application data.

The restart marker inserting unit inserts the restart marker at the end of each of the entropy-encoded segments.

An offset value of a first segment of the plurality of entropy-encoded segments is zero (0).

The offset value of a segment (n) of the plurality of entropy-encoded segments is a sum of the offset value of a segment (n-1), a data size of the restart marker, and a data size of the segment (n).

The calculating unit for calculating an offset value by scan number calculates a segment offset value by scan number with reference to a scan header.

The additional application data comprises at least one of a frame number, a scan number, and an offset value of each segment.

According to the exemplary embodiments, since offset values of the restart markers inserted into the entropy-encoded segments are calculated when a JPEG file is generated, parallel decoding speed can be improved.

BRIEF DESCRIPTION OF THE DRAWINGS

The above and/or other aspects of the present inventive concept will be more apparent by describing certain exemplary embodiments of the present inventive concept with reference to the accompanying drawings, in which:

FIG. 2 illustrates blocks used in a conventional JPEG file format;

FIG. 8 illustrates an example of additional application data for storing the offset value by the scan number calculated at FIG. 7, according to an exemplary embodiment; and FIG. 9 is a flowchart provided for explaining a method for generating a JPEG file, according to an exemplary embodiment.

DETAILED DESCRIPTION OF EXEMPLARY EMBODIMENTS

Figure 1:
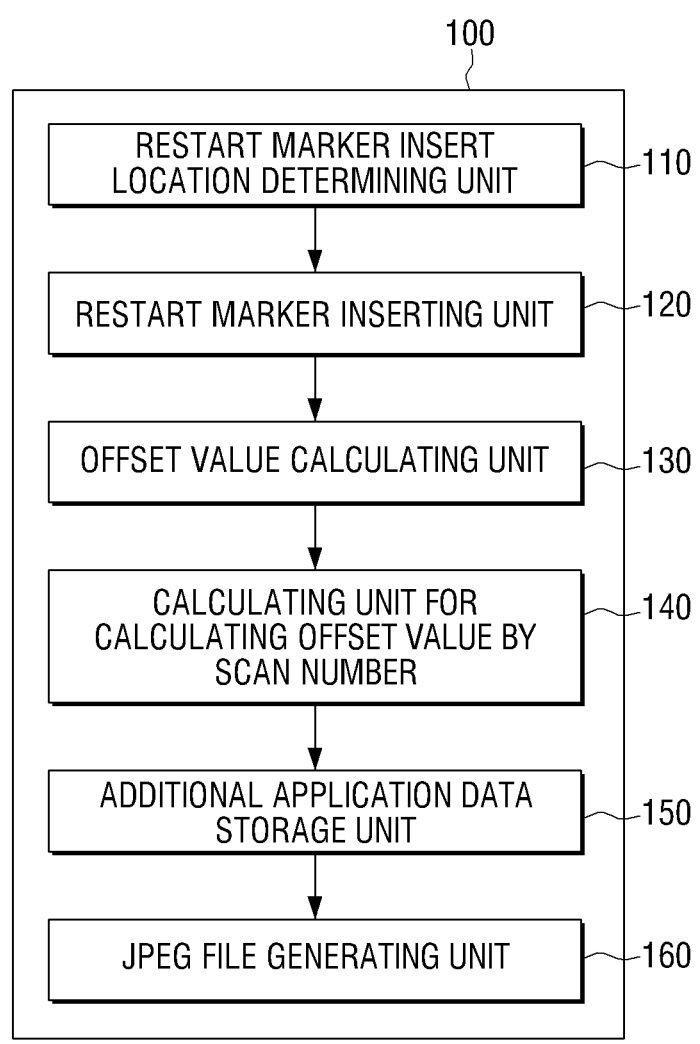
FIG. 1 is a block diagram of an apparatus for generating a Joint Photographic Experts Group (JEPG) file according to an exemplary embodiment.

Certain exemplary embodiments of the present inventive concept will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

FIG. 1 illustrates a block diagram of an apparatus for generating JPEG files, according to an exemplary embodiment. As illustrated in FIG. 1, a JPEG file generating apparatus 100 includes a restart marker insert location determining unit 110, a restart marker inserting unit 120, an offset value calculating unit, a calculating unit 140 for calculating offset value by scan number, an additional application data storage unit 150, and a JPEG file generating unit 160.

Before explaining the constituent components of a JPEG file generating apparatus according to an exemplary embodiment, with reference to FIG. 1, referring to FIGS. 2 to 3, the format and structure of JPEG files will be explained below in order to help better understand the exemplary embodiment.

Figure 3:
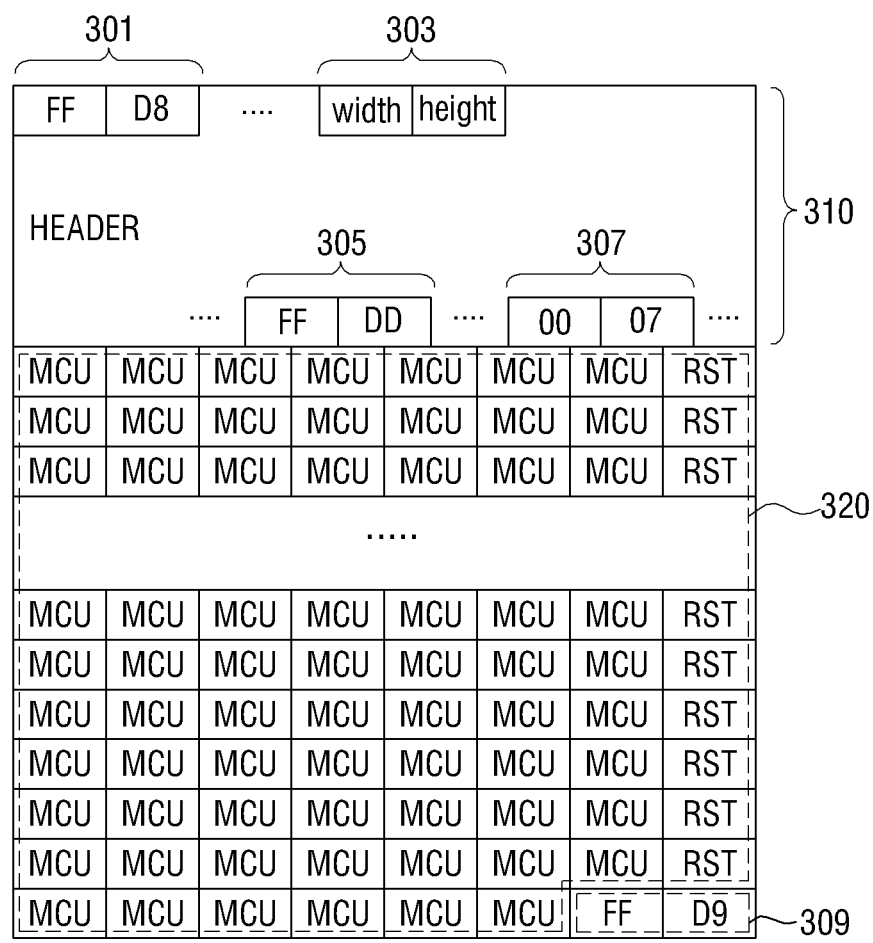
FIG. 3 illustrates a structure of a conventional JPEG file.

FIG. 2 illustrates a view of blocks used in formatting general conventional JPEG files, and FIG. 3 illustrates a view of a conventional JPEG file structure.

Referring to FIG. 2, JPEG file interchange format (JFIF), which is a JPEG file format, includes a plurality of blocks including, start of image (SOI), application data (APP0~APP15), define quantization tables (DQT), start of frame (SOF), define Huffman tables (DHT), start of scan (SOS), scan data, or end of image (EOI). Since the JFIF is already well known in the art, this will not be explained in greater detail herein. A plurality of blocks are divided by a marker. In the JPEG standard, application data such as APP0 and APP1 are necessarily utilized, while other additional application data after APP2 are selectively utilized according to the needs of a user. The other additional application data may include offset values in each scan number generated by the JPEG file generating apparatus, marker and header information according to an exemplary embodiment.

Specifically, the scan data is located next to the SOS, and generated by color model conversion, discrete cosine transformation (DCT), quantization, and Huffman coding of the RGB color information of image sensor pixels.

The restart marker is generally utilized to restore a damaged JPEG file as much as possible. Since JPEG encodes differences between image data, if one image datum is damaged, the next image data is also damaged. Thus, to prevent damaging the entire JPEG image data, the restart marker to restart JPEG decoding in each determined block is located in the scan data.

However, as more restart markers are located in encoded files, a compression rate becomes lower due to the tradeoff between the number of restart markers and the compression rate.

As illustrated in FIG. 3, a JPEG file may be largely divided into a header 310 and data 320. Header 210 includes SOI 301, size information such as image width and depth 303, quantization table, Huffman table, define restart interval (DRI) 305, 307, and EOI 309. Since data 320 includes compressed still image data, and the header includes information at the time of encoding, compressed data 320 is decoded based on the header information. A marker value of the SOI is FFD8, and a marker value of the EOF is FFD9.

Referring back to FIG. 1, the restart marker insert location determining unit 110 analyzes an image and determines insert location of at least one restart marker within a plurality of minimum coded units (MCU) of the image.

For instance, an encoder including the restart marker insert location determining unit may analyze image size, component and bit depth, and may determine, according to a user's needs, the encoding method, such as sequential, progressive, or hierarchical encoding.

Sampling data has to be divided into 8×8 blocks in order to process DCT of JPEG files. These 8×8 blocks are called "data units." If a horizontal/vertical sampling interval is 1×1 pixel, 8×8 pixel blocks may constitute one data unit, and if a horizontal/vertical sampling interval is 2×2 pixel, 16×16 pixel blocks may constitute one data unit. The pixel data of one data unit is sampled, a DCT coefficient is calculated, and quantization is performed.

If only one component of Y, Cb, Cr is stored, pixels are simply divided into (8*horizontal sampling interval)×(8*vertical sampling interval) pixels to be DCTed, and each pixel block is stored, starting from the right top in a sequential order. A group of 8×8 pixels is called minimum coded unit (MCU).

In one embodiment, the restart marker insert location determining unit 110 determines the insert location of a restart marker.

A restart marker may be located at a left-most side of each of the plurality of MCU lines. If a restart marker is located at the left-most side of the MCU line, data may more easily be controlled through parallel decoding.

Figure 4:
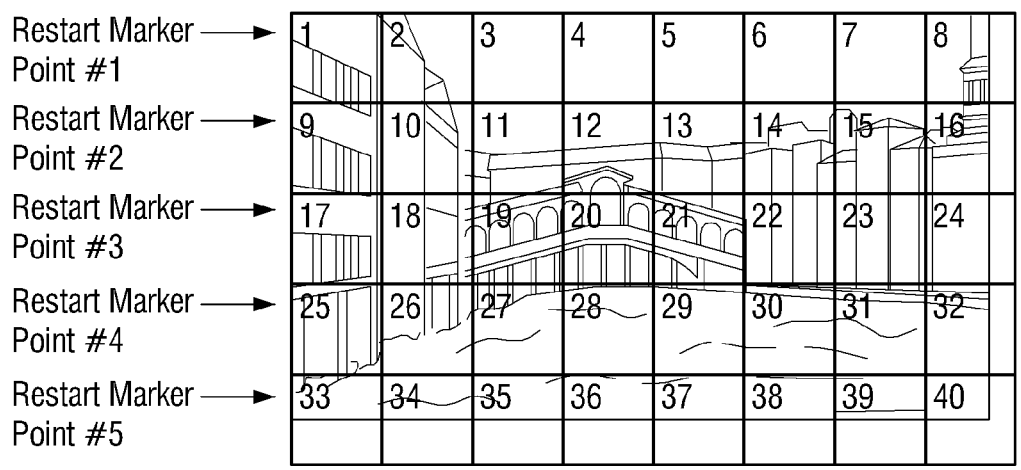
FIG. 4 illustrates an example of determining a location to insert a restart marker according to an exemplary embodiment.

FIG. 4 illustrates an example of determining an insert location of a restart marker. As illustrated in FIG. 4, the restart marker is located at a left-most side of each MCU line. However, an exemplary embodiment is not limited to the location illustrated in FIG. 4. Accordingly, the restart markers may be located within a plurality of MCUs at predetermined intervals.

According to another exemplary embodiment, a user may determine an insert location for at least one restart marker.

Referring back to FIG. 1, restart marker inserting unit 120 divides an image into a plurality of segments according to the determined insert locations of the restart markers, performs entropy encoding, and inserts the restart markers in the determined insert locations with respect to a plurality of entropy-encoded segments.

According to an exemplary embodiment, the JPEG generating apparatus may additionally include a marker related to entropy-encoding, a marker for generating a header, and a header generating unit (not illustrated). The JPEG generating apparatus may also include a temporary storage unit (not illustrated) to temporarily store the marker and the header. The information relating to the temporarily stored marker and header may be utilized in generating a JPEG file by a JPEG file generating unit, which will be explained below.

Because the marker divides blocks of JFIF and the header includes information related to encoding, the marker and the header information may be utilized in decoding.

According to an exemplary embodiment, restart marker inserting unit 120 may insert the restart marker at the end of each entropy-encoded segment.

Figure 5:
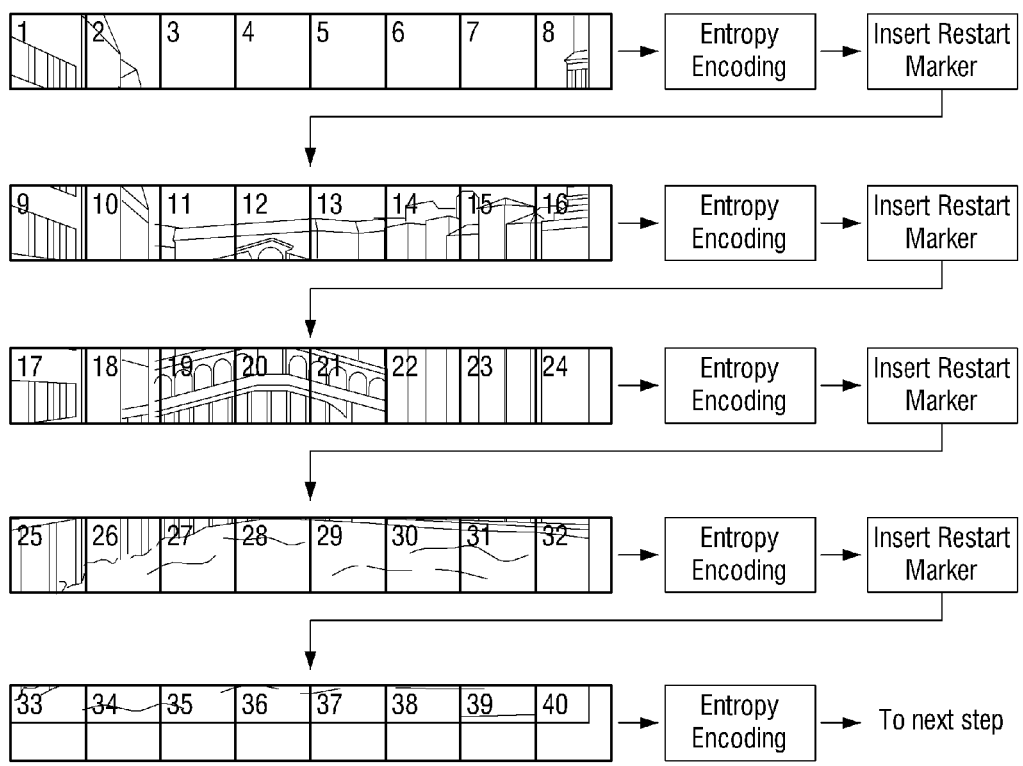
FIG. 5 illustrates an example in which segments distinguished by the restart markers are respectively entropy-encoded, according to an exemplary embodiment.

FIG. 5 illustrates an example of entropy-encoding each segment divided by a restart marker. As illustrated in FIG. 5, after entropy-encoding for each divided segment, restart markers are inserted in the last parts of the segments.

Offset value calculating unit 130 calculates an offset value of at least one restart marker for a plurality of segments based on data size of a plurality of the segments and the data size of the restart marker.

According to an exemplary embodiment, an offset value of segment 1 among the plurality of entropy-encoded segments, may be 0.

This is because segment 1 does not have a restart marker.

In the plurality of entropy-encoded segments, an offset value of segment (n) may be calculated by summing an offset value of segment n-1, data size of a restart marker, and data size of segment (n).

Because the restart marker is inserted in the latter part of the segment, the offset value in each segment can be calculated by utilizing, the data size of each segment.

In other words, the offset value of a currently-entropy-encoded segment including a previously-entropy-encoded segment may be calculated by utilizing the data size of the currently-entropy-encoded segment and an offset value of the previously-entropy-encoded segment.

To be specific, since it is possible to know the data size of each segment after entropy-encoding each segment, and the data size of the restart marker is predetermined, an offset value of the currently-entropy-encoded segment may be calculated by summing an offset value of the previously-entropy-encoded segment, the data size of the restart marker, and the data size of the currently-entropy-encoded segment.

Figure 6:
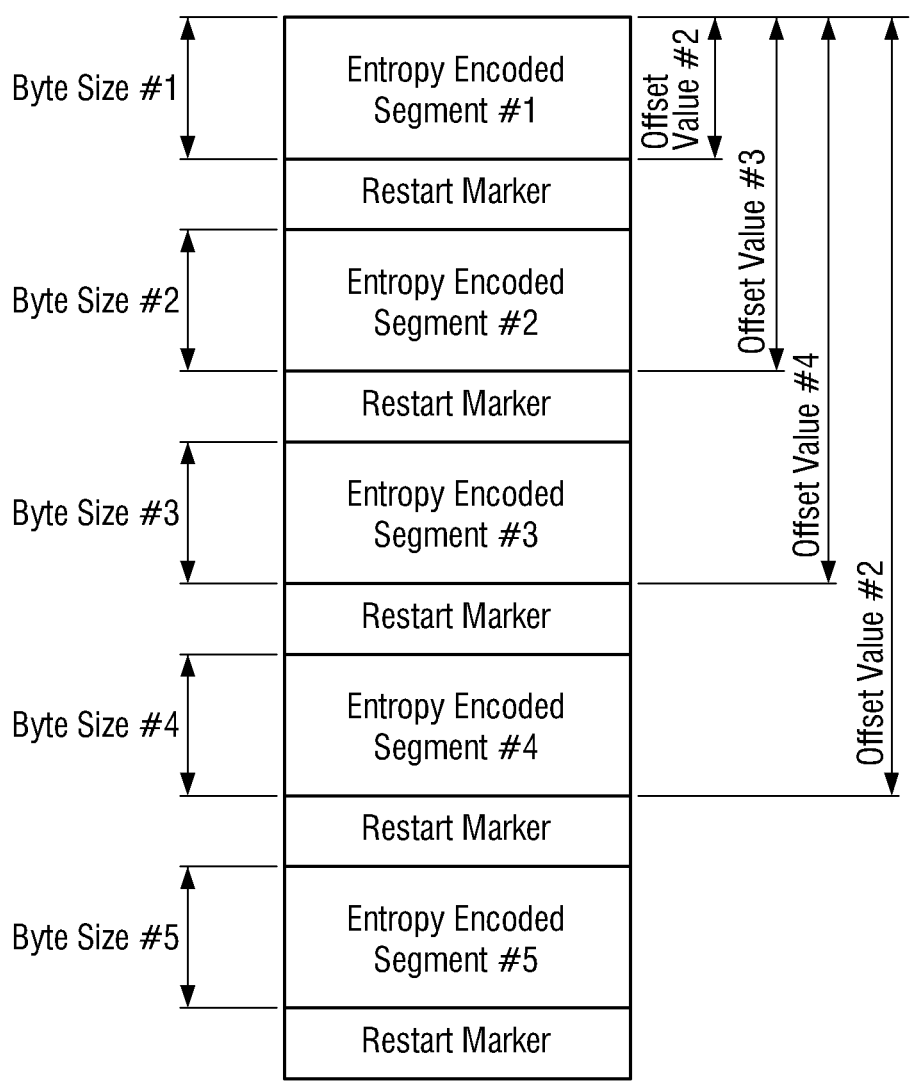
FIG. 6 illustrates an example of calculating a restart offset value for each of the segments, according to an exemplary embodiment.

FIG. 6 illustrates an example of calculating a restart offset value in each segment. As illustrated in FIG. 6, assuming that the number of entropy-encoded segments is 5, the data sizes of segments are marked as size #1 to size #5. Meanwhile, since segment 1 does not include a restart marker, an offset value of segment 1 is 0. Accordingly, an offset value of segment 2 is the data size of segment 1, i.e., "byte size #1," an offset value of segment 3 is a sum of the segment 2 offset value, data size of the restart marker, and data size of segment 3, and thus is "byte size #2."

Accordingly, the segment offset value is calculated by summing the offset value of the previous segment, the data size of the restart marker, and the offset value of the current segment.

If the offset value of the restart marker calculated by offset value calculating unit 130 corresponds to the last segment that is entropy-encoded, calculating unit 140 for calculating the offset value by scan number calculates offset values by scan number from the SOI marker, based on the calculated restart marker offset value.

This is because the offset values calculated by offset value calculating unit 130 are those that simply correspond to the scan data. Accordingly, considering the fact that it is necessary for the decoding unit (not illustrated) to know the offset values of the JPEG file from the start in order to recognize the locations of the respective segments, the decoding speed can be improved.

Each frame of one JPEG file has a different scan number from each other for entropy-encoding according to sampling period of pixels, such as Y, Cb and Cr. Thus, an offset value by each scan number has to be calculated from the SOI marker.

Accordingly, calculating unit 140 for calculating offset value by scan number calculates an offset number by each scan number from the SOI marker, by utilizing offset values calculated by offset value calculating unit 130.

According to an exemplary embodiment, offset value calculating unit 140 calculates an offset value by scan number and may calculate a segment offset value for each scan number based on a scan header.

Figure 7:
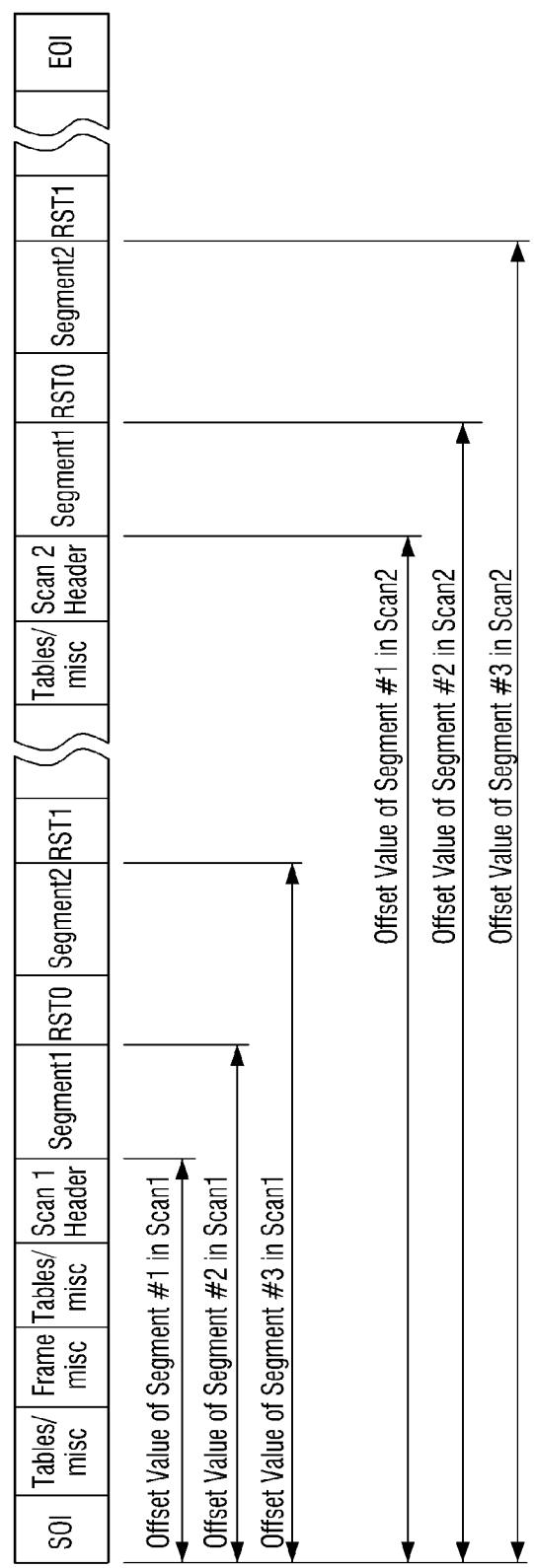
FIG. 7 illustrates an example of calculating a restart offset value for each of the segments based on an offset value by a scan number from a SOI marker, according to an exemplary embodiment.

FIG. 7 illustrates an example of calculating offset value by scan number from the SOI marker, by utilizing restart offset values in segments as illustrated in FIG. 6.

As illustrated in FIG. 7, scan number 1 is divided into 2 segments, and there are three segment offset values from the SOI marker. Although not entirely illustrated in FIG. 7, the segment offset values by scan number are calculated from the SOI marker. Also, the segment offset value in each scan number is calculated based on a scan header.

Additional application data storage unit 150 stores, as additional application data, an offset value by scan number. The offset value by scan number is calculated by the offset value by scan number, which is calculated by offset value calculating unit 140, for calculating offset value.

For instance, additional application data unit 150 may be APP2 to APP15 of the JPEG file formats explained with reference to FIG. 2, to which application data are stored.

According to an exemplary embodiment, additional application data may include at least one of a frame number, a scan number, and a segment offset value.

FIG. 8 illustrates an example of additional application data to which offset value by scan number, calculated in FIG. 7, is stored.

As illustrated in FIG. 8, additional application data may include frame number, a scan number, or an offset value in each segment.

JPEG file generating unit 160 generates JPEG files by integrating a marker and a header stored in the temporary storage unit, a plurality of entropy-encoded segments, and the stored additional application data.

Thus, the JPEG file generating unit, according to an exemplary embodiment, improves parallel decoding speed by calculating and storing a restart marker offset value inserted in each segment of scan data, and encoding the stored data, thereby enabling fast decoding by distinguishing a plurality of segments, according to the stored offset values.

Meanwhile, the components overlapping with those of the JPEG file generating apparatus, explained above, will only be explained briefly hereinbelow.

FIG. 9 illustrates a flowchart of a method for generating JPEG files according to an exemplary embodiment.

At S910, an image is analyzed.

According to an exemplary embodiment, an image may be analyzed, and an insert location of at least one restart marker, within a plurality of MCUs of the image, may be determined.

The insert location of at least one restart marker may be arbitrarily determined by a user.

For instance, size, component, and bit-depth of the image may be analyzed, and an encoding method such as sequential, progressive or hierarchical may be determined according to the needs of a user.

At S920, a marker and a header are generated.

According to an exemplary embodiment, temporarily storing (not illustrated) the marker and the header may be additionally included. The information on the temporarily stored marker and header may be utilized to generate JPEG files.

That is, since the marker may be used to divide JFIF blocks, and the header may include encoding information, the information on the marker and the header may be utilized in decoding.

At S930, the plurality of divided segments is entropy-encoded, respectively.

At S930, according to the insert location of the restart marker, the image may be divided into a plurality of segments and encoded.

At S940, the restart marker is inserted in the determined insert location of each entropy-encoded segment.

According to an exemplary embodiment, at the restart marker inserting step (S940), the restart marker may be inserted in the last part of each entropy-encoded segment.

At S950, at least one restart marker offset value in each segment is calculated based on the data size of the plurality of segments and on the data size of the restart marker.

At this step, an offset value of segment 1 in the plurality of entropy-encoded segments may be zero (0), an offset value of segment (n) from among the plurality of entropy-encoded segments may be calculated by summing an offset value of segment (n-1), the data size of the restart marker, and the data size of segment (n).

At S960, whether or not the segment is the last segment detected, and at S970, if the calculated offset value of the restart marker corresponds to that of the last entropy-encoded segment, an offset value by scan number is calculated from the SOI marker based on the calculated restart marker offset value at S970. If the segment is not the last one, S930 to S950 repeat.

According to an exemplary embodiment, the calculating of the offset value by scan number at S970 may include calculating a segment offset value by scan number based on a scan header.

At S980, the calculated offset value by each scan number is stored as additional application data.

The additional application data may include one of frame number, scan number and an offset value in each segment.

At S990, a JPEG file is generated by integrating the marker and the header generated at S920, a plurality of entropy-encoded segments, and the stored additional application data.

According to an exemplary embodiment, a method of generating a JPEG file improves parallel decoding speed by calculating and storing a restart marker offset value inserted in each segment of scan data, and encoding the stored data, thereby enabling fast decoding by distinguishing of a plurality of segments according to the stored offset values.

The method for generating JPEG files according to the exemplary embodiments may be implemented in the form of program commands to be executed through a variety of computing means and recorded on a non-transitory computer-readable medium. The computer-readable medium may include program command, data file, or data structure singularly or in combination. The program command recorded on said medium may be designed and constructed specifically for the exemplary embodiment, or for embodiments which are known and available to those skilled in the computer software area.

The computer-readable medium may be magnetic media such as a hard disk, a floppy disk and a magnetic tape, optical media such as CD-ROM and DVD, magneto-optical media such as floptical disk, and a hardware apparatus storing and performing program commands such as ROM, RAM, and flash memory. The medium may utilize transmit media such as optics, metal wire, and waveguides including carrier transmitting signals, determining program commands and data structures.

The program commands may include high-level code utilized by an interpreter and implemented by a computer, as well as machine code made by a compiler. The hardware apparatus may perform as at least one software module in order to perform functions, and vice versa.

The foregoing exemplary embodiments and advantages are merely exemplary and are not to be construed as limiting the present invention. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

What is claimed is:

1. A method for generating a Joint Photographic Experts Group (JEPG) file at an encoding apparatus, the method comprising:
   determining a location to insert at least one restart marker by analyzing an image;
   entropy-encoding, by dividing the image into a plurality of segments based on the determined location for inserting the restart marker, and inserting the restart marker to the determined location in order to insert the restart marker with respect to each of the plurality of entropy-encoded segments;
   calculating an offset value of the at least one restart marker with respect to each of the plurality of segments, based on a data size of each of the plurality of segments and a data size of the restart marker;
   calculating an offset value by scan number from a start of image (SOI) marker based on the calculated offset value of the restart marker, in response to the calculated offset value of the restart marker corresponding to a last segment that is entropy-encoded; and
   storing the calculated offset value by scan number as additional application data.

2. The method of claim 1, wherein the location to insert the at least one restart marker is randomly set by a user.

3. The method of claim 1, further comprising: after analyzing the image, generating a marker and a header related to the entropy-encoding.

4. The method of claim 3, further comprising temporarily storing the marker and the header.

5. The method of claim 3, further comprising generating the JPEG file by integrating the marker and the header, the plurality of entropy-encoded segments, and the stored additional application data.

6. The method of claim 1, wherein the inserting of the restart marker to the determined insert location comprises inserting the restart marker at the end of each of the entropy-encoded segments.

7. The method of claim 1, wherein an offset value of a first segment of the plurality of entropy-encoded segments is zero (0).

8. The method of claim 1, wherein the offset value of a segment (n) of the plurality of entropy-encoded segments is a sum of the offset value of a segment (n-1), a data size of the restart marker, and a data size of the segment (n).

9. The method of claim 1, wherein calculating the offset value by scan number comprises calculating a segment offset value by scan number with reference to a scan header.

10. The method of claim 1, wherein the additional application data includes at least one of a frame number, a scan number, and an offset value of each segment.

11. An apparatus for generating a Joint Photographic Experts Group (JEPG) file, the apparatus comprising:
    a restart marker insertion location determining unit which determines a location to insert at least one restart marker by analyzing an image;
    a restart marker inserting unit which performs entropy-encoding, by dividing the image into a plurality of segments based on the determined location in order to insert the restart marker, and inserts the restart marker at the determined insertion location, with respect to each of the plurality of entropy-encoded segments;
    an offset value calculating unit which calculates an offset value of the at least one restart marker with respect to each of the plurality of segments, based on a data size of each of the plurality of segments and a data size of the restart marker;
    a calculating unit which calculates an offset value by scan number, which calculates an offset value by scan number from a start of image (SOI) marker based on the calculated offset value of the restart marker, in response to the calculated offset value of the restart marker corresponding to a last segment that is entropy-encoded; and
    an additional application data storage unit which stores the calculated offset value by scan number as additional application data.

12. The apparatus of claim 11, wherein the location to insert the at least one restart marker is randomly set by a user.

13. The apparatus of claim 11, further comprising a marker and header generating unit which generates a marker and a header related to the entropy-encoding.

14. The apparatus of claim 13, wherein, the marker and the header are adapted to be temporarily stored in a temporary storage unit.

15. The apparatus of claim 13, further comprising a JPEG file generating unit which generates the JPEG file by integrating the marker and the header, the plurality of entropy-encoded segments, and the stored additional application data.

16. The apparatus of claim 11, wherein the restart marker inserting unit inserts the restart marker at the end of each of the entropy-encoded segments.

17. The apparatus of claim 11, wherein an offset value of a first segment of the plurality of entropy-encoded segments is zero (0).

18. The apparatus of claim 11, wherein the offset value of a segment (n) of the plurality of entropy-encoded segments is a sum of the offset value of a segment (n-1), a data size of the restart marker, and a data size of the segment (n).

19. The apparatus of claim 11, wherein the calculating unit for calculating offset value by scan number calculates a segment offset value by scan number with reference to a scan header.

20. The apparatus of claim 11, wherein the additional application data comprises at least one of a frame number, a scan number, and an offset value of each segment segment.

* * * * *